US005571360A

United States Patent [19]

Ciccotelli et al.

[11] Patent Number: 5,571,360

[45] Date of Patent: Nov. 5, 1996

[54] NAME PLATE FORMING METHOD

[75] Inventors: Anthony Ciccotelli, Eldora, N.J.; George Barrar, Morton; Bob Fuss, Havertown, both of Pa.; Christopher Flaherty, Nokomis, Fla.; Peter Peroni, Pottstown, Pa.

[73] Assignee: LaFrance Corporation, Philadelphia, Pa.

[21] Appl. No.: 284,915

[22] Filed: Aug. 2, 1994

Related U.S. Application Data

[63] Continuation of Ser. No. 79,259, Jun. 21, 1993, abandoned.

[51] Int. Cl.$^{6}$ .................... B32B 31/00

[52] U.S. Cl. .................... 156/251; 156/261; 156/515; 156/522

[58] Field of Search .................... 156/515, 522, 156/528, 540, 541, 581, 251, 261, 264, 265

[56] References Cited

U.S. PATENT DOCUMENTS

| | | | |
|---|---|---|---|
| 3,332,826 | 7/1967 | Johnson | 156/515 |
| 4,008,115 | 2/1977 | Fairbanks et al. | 156/267 |
| 4,043,858 | 8/1977 | Dantowitz | 156/251 |
| 4,073,671 | 2/1978 | Licata | 156/261 X |
| 4,094,944 | 6/1978 | Paetz | 156/261 X |
| 4,288,279 | 9/1981 | Blore et al. | 156/515 X |
| 4,380,484 | 4/1983 | Repik et al. | 156/515 X |
| 4,510,006 | 4/1985 | Lawson | 156/265 X |
| 4,999,081 | 3/1991 | Buchanan | 156/515 |
| 5,094,707 | 3/1992 | Bruno | 156/515 X |

*Primary Examiner*—David A. Simmons
*Assistant Examiner*—Paul M. Rivard
*Attorney, Agent, or Firm*—Connolly & Hutz

[57] ABSTRACT

A system for forming burr-less edged name plates includes a shearing station. A die block is provided in the shearing station. An adhesive backing member is disposed above the die block and includes an adhesive coating on a release paper. A name plate assembly is disposed above the backing member for adhesive contact with the backing member. The name plate includes a plurality of name plates connected by a connector web. Each name plate is secured to the web along only one side edge with the remaining side edges being exposed. As a result the remaining side edges could be formed without the formation of burrs. A shear bar is disposed above the name plate and includes a shearing blade for cutting through the connection along the side edge of each name plate and the web and through the backing member to form a plurality of name plate units each of which comprises the name plate and the portion of the backing member in contact with the name plate. As a result, each name plate unit could be mounted to a support member by removing the release paper to expose the adhesive coating.

10 Claims, 4 Drawing Sheets

NAME PLATE FORMING METHOD

CROSS-REFERENCE TO RELATED APPLICATION

This application is a continuation of application Ser. No. 08/079,259 filed Jun. 21, 1993, now abandoned.

BACKGROUND OF THE INVENTION

Various techniques exist for forming name plates. In a successful practice the name plates are injection molded. In the conventional techniques, however, the plate is blanked with such pressure that the stress created causes a slight concave curvature on the back of the name plate. As a result, the adhesive applied to the back of the name plate does not stick in the central area of the plate.

A further disadvantage with conventional techniques is that the edges have burrs which are unsightly or which require additional steps to remove the burrs so as to provide a better finished name plate.

SUMMARY OF THE INVENTION

An object of this invention is to provide a system performing burr-less edged name plates.

A further object of this invention is to provide such a system wherein the name plate remains flat without any concavity on its back surface so that the entire adhesive surface could be utilized to mount the name plate in place.

In accordance with this invention the name plates are fed to a shearing station having a die block. An adhesive backing member is disposed above the die block. The name plate assembly is in the form of at least one and preferably a number of name plates connected to a connector web along only one side edge of each name plate. As a result, the three remaining exposed edges could be formed without burrs. The undersurface of each name plate is disposed against the adhesive surface of the backing member with a release paper covering the adhesive surface. In order to separate the name plate from the connector web a shear bar is utilized which includes a shearing blade for cutting through the connection of the one side edge of each name plate and its web so that only that one side edge need have any finishing treatment if necessary to remove any burrs. The name plate may then be mounted by removing the release paper to expose its adhesive coating.

In a preferred practice of the invention the shear bar acts as an anvil to effectively press each name plate against the backing member. The backing member may be provided with adhesive only on the portions of the backing member intended to be contacted by the name plate. As a result, when the shear bar cuts through the name plates the excess material is virtually free of adhesive which facilitates reuse of the material.

In the preferred practice of the invention the shear bar has an upwardly curved or tapered cutting blade so that the cutting action takes place progressively as the shear bar is moved downwardly through the connection of the name plate and connector bar.

THE DRAWINGS

DETAILED DESCRIPTION

Figure 1:
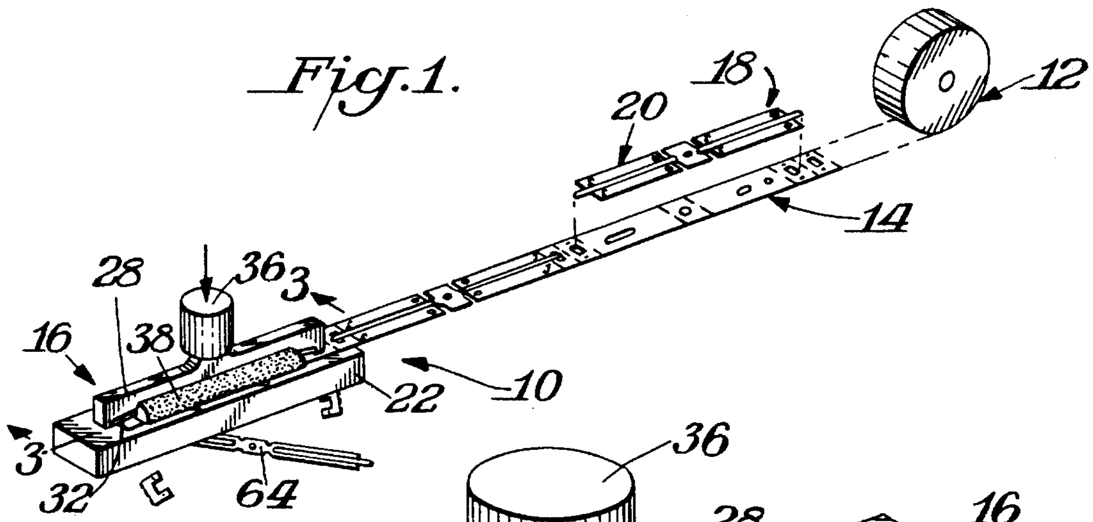
FIG. 1 is a perspective view schematically showing a system for forming burr-less name plates in accordance with this invention.

FIG. 1 illustrates a system 10 for forming burr-less edged name plates in accordance with this invention. As shown therein a feed station 12 is provided for feeding a backing member 14 to a shearing station 16. Backing member 14 is in the form of a tape like structure having an adhesive coating as later described. The feed station 12 may be of any suitable construction. For example, backing member 14 may be wound on a roll and fed in any suitable manner, such as by a hitch feed or index feed toward shearing station 16. If desired, suitable sensing devices, such as optics may be utilized to synchronize the feed of backing member 14 at the proper time and speed.

As also shown in FIG. 1 a feed station 18 is provided of any suitable construction for feeding a plurality of name plate assemblies 20 onto contact with backing member 14 before the backing member enters the shearing station 13.

Figure 2:
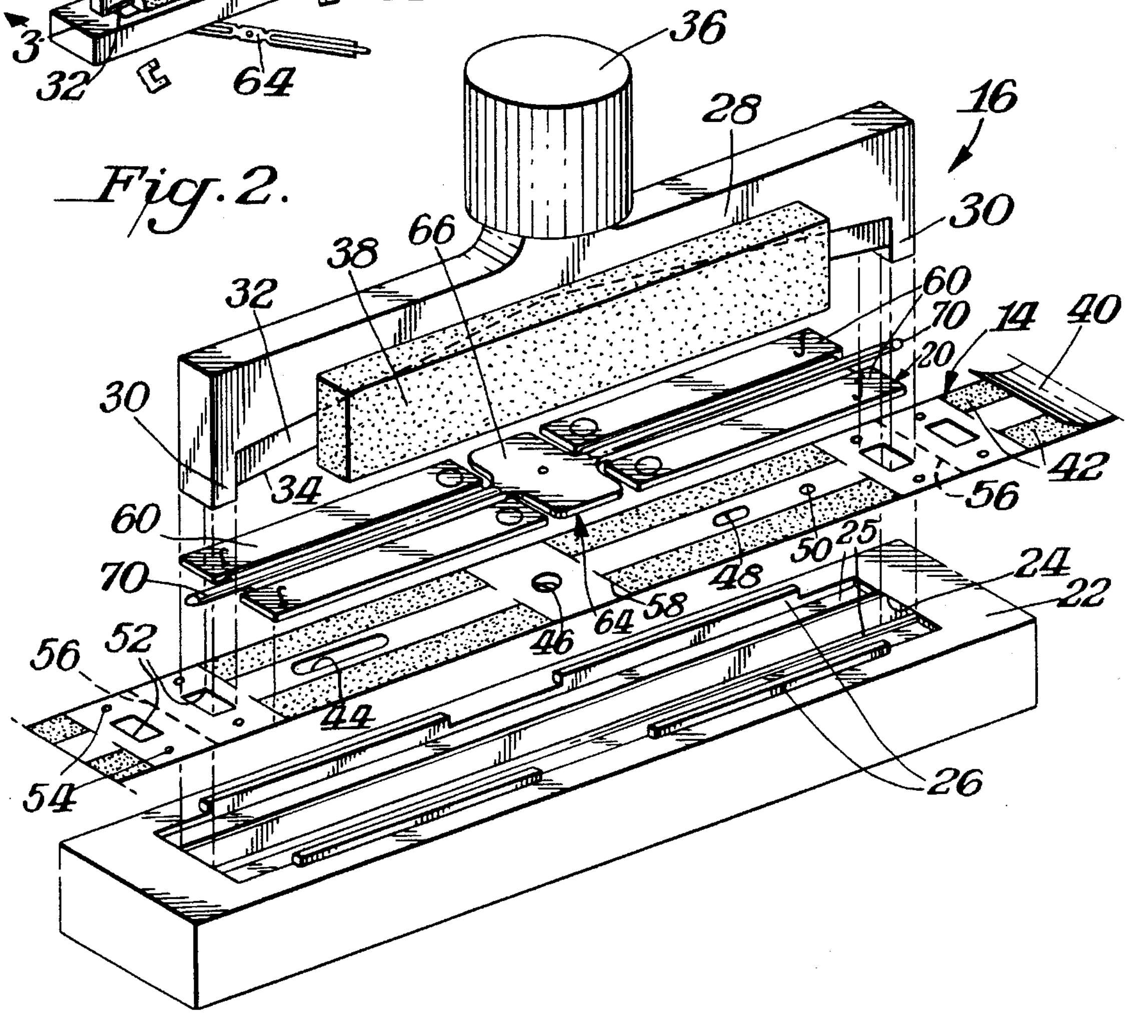
FIG. 2 is a perspective exploded view of the shearing station used in the system of FIG. 1.

As shown in FIG. 2 shearing station 16 includes a die half or die block 22 having a central slotted opening 24. Sets of index and back up bars 26 are provided on the upper surface of die block 22.

Figure 4:
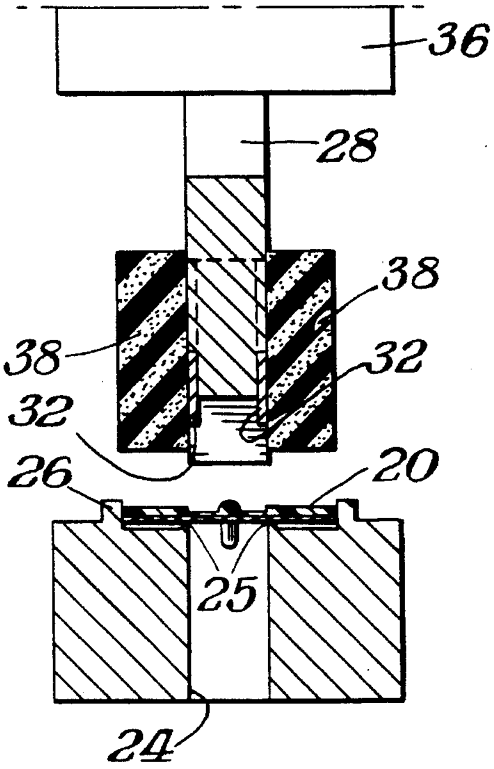
FIG. 4 is a lateral cross-sectional view showing the shearing station before the cutting operation.
Figure 5:
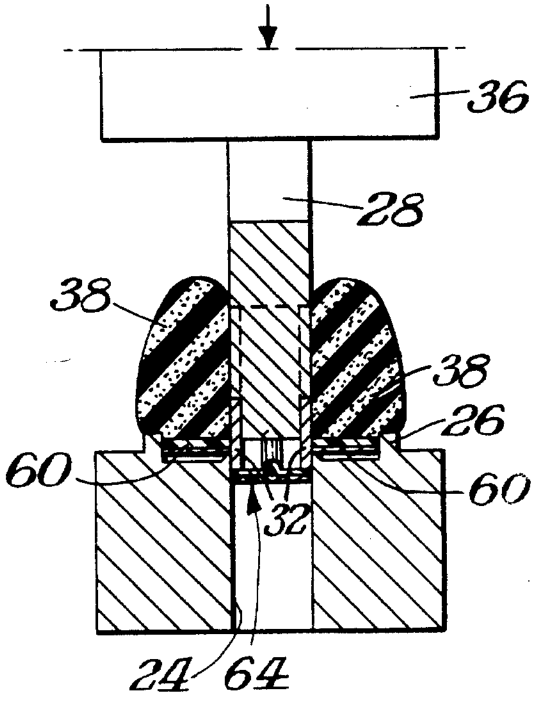
FIG. 5 is a view similar to FIG. 4 showing the cutting operation.

As shown in FIGS. 4–5 the die sections are ground to form a chisel edge 25. Edge 25 may be a 0.020 inch chisel edge, i.e. extend 0.020 inch above the adjacent flat surface. The edge 25 cuts through the adhesive eliminating any burr.

Figure 3:
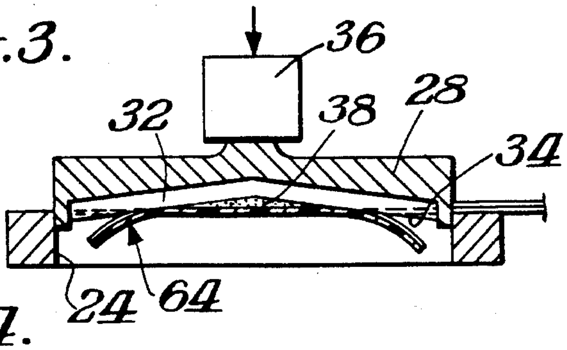
FIG. 3 is a cross-sectional view taken through FIG. 1 along the line 3—3.

Shearing station 16 also includes a shear bar 28 which terminates in a pair of oppositely disposed anvils 30 and which includes a pair of shear blades 32. As best shown in FIG. 3 each shear blade 32 has a tapered cutting edge 34. Edge 34 could be arcuate but is preferably an inverted V. Shear bar 28 is mounted to a drive head 36 which would be moved up and down in any suitable manner. A hold down tab 38 is provided on each side of shear bar 28. Tabs 38 are made of any suitable material, such as a urethane foam.

As best shown in FIG. 2 backing member 14 includes a release paper 40 having adhesive 42 selectively applied in any suitable manner, such as by being screen printed. Preferably, adhesive 42 is applied only in the areas intended to be contacted by the individual name plates. Backing member 14 also includes a plurality of indexing holes or openings. FIG. 2, for example, illustrates an elongated slot 44, a center hole 46, a small slot 48, a small circular hole 50 and an intermediate slot 52 having circular holes 54 on each side thereof. Backing member 40 also preferably has perforated lines 56 separating each section from its adjacent section. If desired, bend lines or perforated lines 58 may also be provided at an area where a name plate ends.

Each name plate assembly 20 includes at least one and preferably a plurality, such as four individual name plates or substrates 60. Name plates 60 are injection molded to a connector piece 64 having a center section 66 and a pair of centrally located elongated gates or wings 70 which form the connector web. As a result of this arrangement each name plate 60 is secured to the connector web 66 along only one edge with the remaining edges being exposed. Thus when, for example, the name plate assembly 20 is injection molded the exposed edges are burr-free. Preferably, the connecting edge of each name plate 60 is secured to a portion 72 of gate 70 which is thinner than the central portion. If desired, parts of the connecting edge may also be exposed and the actual connection of each name plate with the web could be along a minimal location sufficient to securely mount each name plate to the connector web, but leaving enough of the exposed edge free of burrs.

Figure 8:
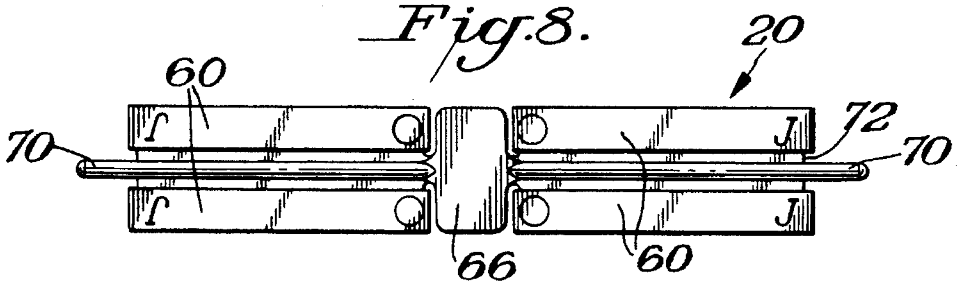
FIG. 8 is a top plan view of the assembly shown in FIG. 7.
Figure 7:
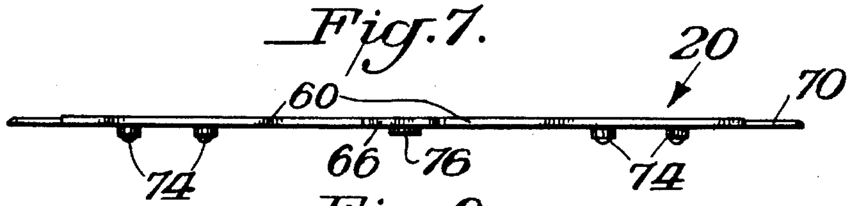
FIG. 7 is a side elevational view of the name plate assembly which includes a connector web and a plurality of name plates.
Figure 9:
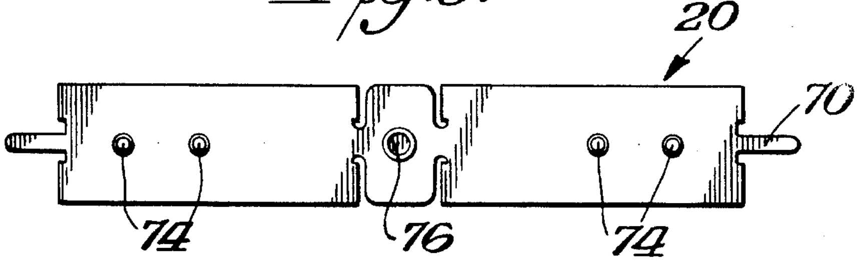
FIG. 9 is a bottom plan view of the assembly shown in FIGS. 7–8.
Figure 10:
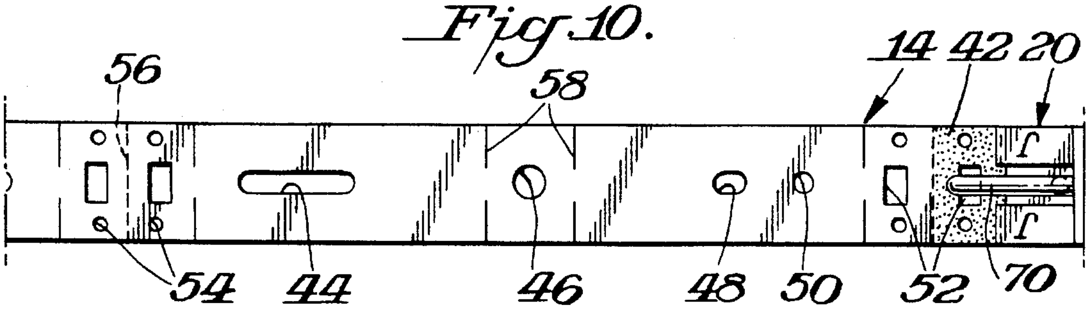
FIG. 10 is a top plan view of the backing member used in the system shown in FIGS. 1–5.
Figure 11:
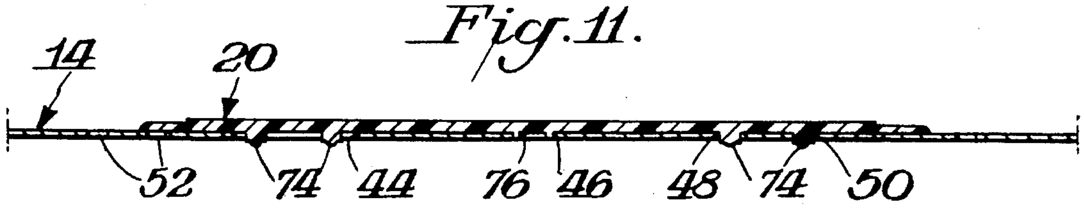
FIG. 11 is a cross-sectional view in elevation showing a name plate assembly mounted to a backing member in the system shown in FIGS. 1–5.

FIG. 8 illustrates a name plate assembly which includes the thin connecting portion 72 leading from the fixed central portion of gates or wings 70 along the connecting edge. As shown in FIGS. 7 and 8 a pair of pins or extensions 74 is secured to each gate 70 for location in corresponding openings in backing member 14. For example, one set of pins 74 would be disposed in openings 48, 50 of backing member 14 while the other set of pins 74 would be disposed in elongated slot 44. A central projection 76 extends from the bottom of web 64 and is located in central opening 46 of backing member 14. FIG. 11 shows the unit which results from name plate assembly 20 being mounted on backing member 14.

As previously described, the adhesive 42 is located on release paper 40 in the areas where the adhesive 42 will be in contact with the underside of each respective name plate 60. The web, however, would contact release paper 40 where the release paper is free of adhesives. The ends of gates 70 are located above and extend slightly beyond each end slot 52.

After a name plate assembly 20 has been mounted on backing member 14 the resulting unit is moved into shearing station 16 between block 22 and shearing bar 28. Backing member 14 is mounted on the upper surface of shearing block 22. As shearing bar 28 is moved downwardly the anvils 30 contact the ends of gates 70 and move into slots 52 of release paper 40. This initially forces name plate assembly 20 into intimate contact with backing member 14 in the area of gates 70. Pads 38 are also pressed against the upper surface of name plate assembly 20 to further move the name plate assembly into intimate contact with backing member 14 so that the adhesive 42 is pressed against the underside of each respective name plate 60. Continued movement of shearing bar 28 results in each respective shearing blade 34 cutting through the unit comprised of name plate assembly 20 and backing member 14.

In the illustrated embodiment two shearing blades 32 are provided as shown in FIGS. 4–5. Each shearing blade 32 is intended to simultaneously cut through a pair of name plates 60 on each side of web 64. Because of the tapered or arcuate cutting edge 34 the cutting action takes place progressively which results in a smooth and less ragged cut than if a straight cutting edge were used. Thus, FIG. 4 illustrates the shearing bar 28 before any contact is made with the name plate assembly and backing member unit. FIG. 5 shows a further sequence in operation after the shearing blade 28 has cut through the unit whereupon the portion of web 64 and of backing paper 42 between the shearing blades 32 falls through the central slot 24 of mounting block 22 where it can be collected for later disposal. Because there is no adhesive on that portion of backing member 14 the backing member 14 and web are easily separated from each other. FIG. 1 also illustrates the cut portion falling through central slot 24. The portions of web 64 and backing member 14 on the outer sides of the shearing blades 32 also remain separate from each other and are separate from the name plates so that these portions of web 64 and backing member 14 can also be readily disposed of as shown for example in FIG. 1.

Figure 6:
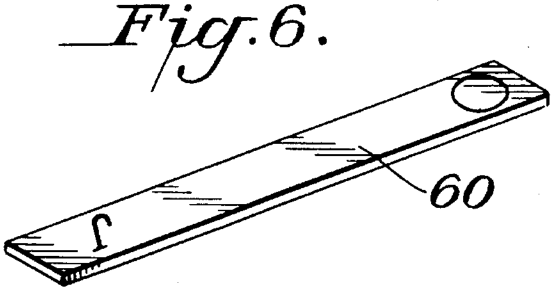
FIG. 6 is a perspective view of a finished name plate.

Since the only connection of each name plate 60 with web 64 is along only one edge, the cutting action of shearing blades 32 results in each name plate being completely separated into an individual unit as shown in FIG. 6. Any burrs or irregularities in this cut edge could easily be finished so that the resultant name plate is free of burrs. The resultant name plate also has the corresponding portion of backing member 14 secured thereto by means of the adhesive 42. The shearing action is such that the underside of name plate 60 remains flat in its finished form. Thus when it is desired to mount a name plate to a support surface all that need be done is to strip the release paper 40 from the name plate unit thereby exposing the adhesive 42 which remains on the undersurface of name plate 60 and name plate 60 could then be pressed against a support surface.

Figure 12:
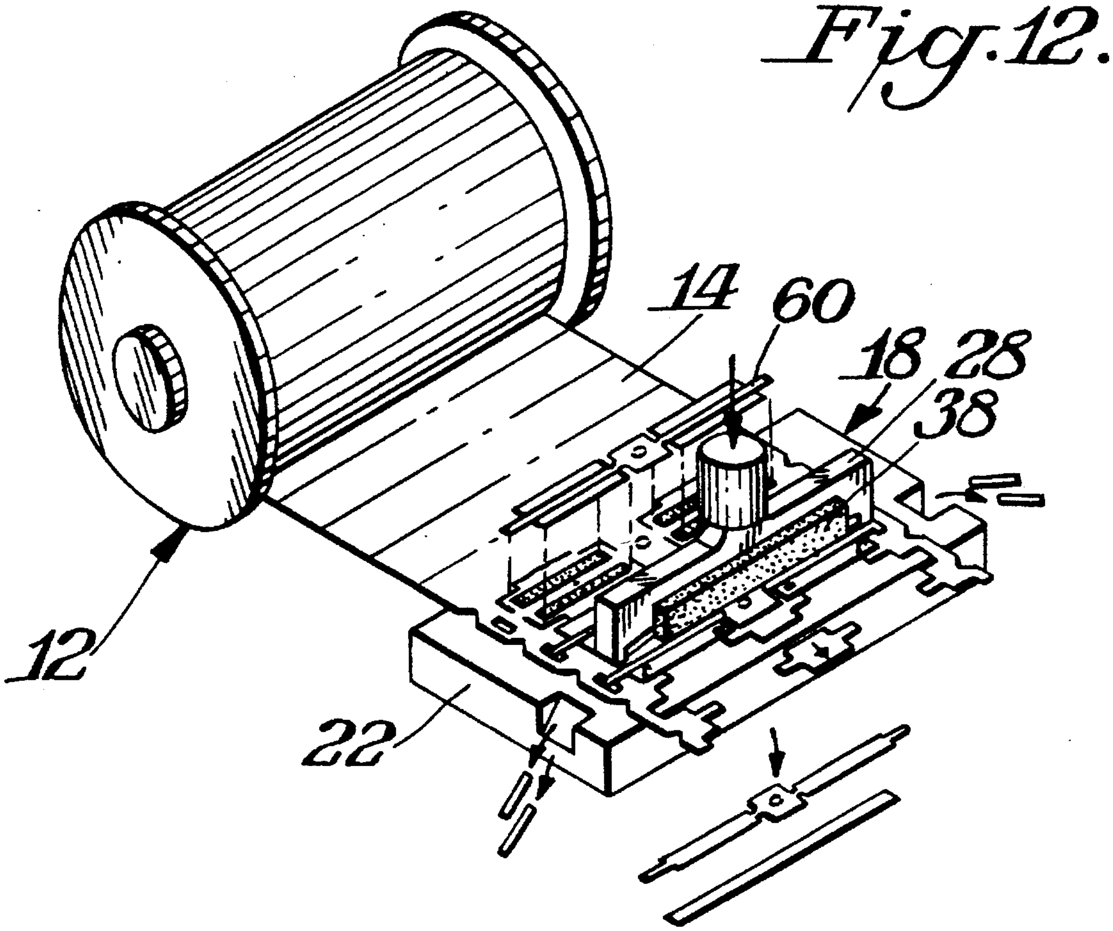
FIG. 12 is a view similar to FIG. 1 of an alternative system in accordance with this invention.

FIG. 12 shows a system similar to FIG. 1 of an alternative practice of the invention. As shown therein tape 14 is again fed from a roll in the feed station 12. The name plate feed station 18, however, utilizes index means to feed the name plates 60 in a direction transverse to the direction of the tape movement, rather than being longitudinally fed as in FIG. 1.

It is to be understood that this invention may be practiced in its broadest aspect with only a single name plate secured to a connector web. It is preferred, however, that a plurality of name plates be secured to a connector web with each name plate mounted along only one edge to the gate portion of the connector web. In the preferred practice four such name plates are provided with the name plates of each set being end to end and the sets being side by side.

What is claimed is:

1. A method of forming burr-less edged injection molded name plates comprising feeding a backing member in the form of a tape having an adhesive coating on release paper to a shearing station, feeding a plurality of injection molded name plate assemblies onto contact with the backing member before the backing member enters the shearing station with each name plate assembly including at least one name plate and an integral connector web wherein the name plate is secured along only one side edge of the connector web and the remaining three side edges being exposed and being burr-less, disposing the name plate assemblies and backing member with respect to each other whereby the adhesive coating is remote from the name plate assemblies, and cutting through the connection of the one side edge of the name plate and the web and through the backing member by a shear blade of a shearing bar in the shearing station to form a name plate unit comprising the name plate and the portion of the backing member in contact with the name plate with all of the exposed edges of the name plate being burr-less.

2. The method of claim 1 wherein a plurality of name plates is secured to a single connector web, and simultaneously cutting through the connections by a pair of shearing blades each of which is upwardly tapered.

3. The method of claim 2 including feeding name plate assemblies which include a pair of end to end name plates mounted on each side of the connector web and which include the connector web having a central portion extending between the end to end name plates with a pair of gate portions extending between side by side name plates.

4. The method of claim 3 including contacting the end of each gate portion by an anvil on the shear bar during the cutting step.

5. The method of claim 2 including supporting the name plate assembly and backing member on a die block during the cutting step, providing the die block with chisel edges and a slot completely therethrough, and permitting portions of the web and the backing member between the shearing blades to fall through the slot after the cutting step.

6. The method of claim 1 wherein the name plate is flat before the cutting step, and the name plate remaining flat after the cutting step to maintain surface to surface contact between the name plate and backing material.

7. The method of claim 1 wherein the adhesive coating is confined to the name plate portion of the name plate assembly, and the portion of the name plate assembly in excess of the name plate portion being free of adhesive after the cutting step to facilitate reuse of the excess portion.

8. The method of claim 1 including supporting the name plate assembly and backing member on a die block in the shearing station during the cutting step.

9. The method of claim 8 wherein the die block has chisel edges and a slot completely therethrough, and permitting portions of the web to fall through the slot after the cutting step.

10. The method of claim 8 including disposed registry pins on the name plate assembly into registry holes in the backing member to register the backing member with the name plate assembly into a unit before the cutting step, and orienting the unit on the die block by index bars on the upper surface of the die block.

* * * * *